May 11, 1965   J. W. BORGER ETAL   3,182,609
MULTIPLE DECK RACK MEANS ATTACHMENT FOR RAILWAY CARS
Filed May 22, 1961   3 Sheets-Sheet 3

INVENTORS
JACK W. BORGER
ANDREW J. CHRISTIAN

BY Cromwell, Greist & Warden
ATTYS.

United States Patent Office 3,182,609
Patented May 11, 1965

3,182,609
MULTIPLE DECK RACK MEANS ATTACHMENT
FOR RAILWAY CARS
Jack W. Borger, Calumet City, and Andrew J. Christian, Chicago, Ill., assignors to Pullman Incorporated, Chicago, Ill., a corporation of Delaware
Filed May 22, 1961, Ser. No. 111,601
4 Claims. (Cl. 105—368)

The invention relates to a new and improved vehicle including multiple deck lading supporting rack means and special attachment means therefor. More specifically, the invention is directed to a vehicle such as a railway car provided with special cushioned attachment means for the interconnection of a tiered lading supporting rack member thereof permitting controlled travel of the rack member relative to the vehicle in response to operational shock while protecting the lading from damage which might result from the transmission of said shock thereto.

Cushioned rack members for mounting on the open deck portion of a railway car used in piggyback lading operations have been designed for use with truck trailers, containers and various other types of lading. Such rack members are intended to provide lading attachment as well as lading vertical load support in many instances with the rack members mounted on the car for movement relative thereto in response to operational shock such as in buff and draft. Suitable cushioning means, such as hydraulic cylinders or multiple pad assemblies, interconnect the rack member to the car and operate during relative movement of the rack member to absorb the operational shock thus protecting the lading attached to the rack member from such shock. With the increase in piggyback lading operations in the railroad industry, rack member designs have extended to many different forms of lading including automobiles or other similar wheel supported vehicles subject to transportation on multiple tiered carriers.

It is an object of the present invention to provide a new and improved vehicle and tiered lading supporting rack member particularly adapted for use in the transportation of automobiles and the like.

A further object is to provide a new and improved railway car adapted for automobile piggyback operation, the car including a tiered lading supporting rack member which is interconnected to the car through specially and uniquely operating cushioning means.

Still a further object taken in conjunction with the foregoing objects is to provide a new and improved railway car of the type described wherein the rack member interconnecting cushioning means are mounted outboard of the car to permit unimpeded use of the deck area of the car for the lowermost tier of the rack member.

Other objects not specifically set forth will become apparent from the following detailed description of the invention made in conjunction with the accompanying drawings wherein.

Figure 1:
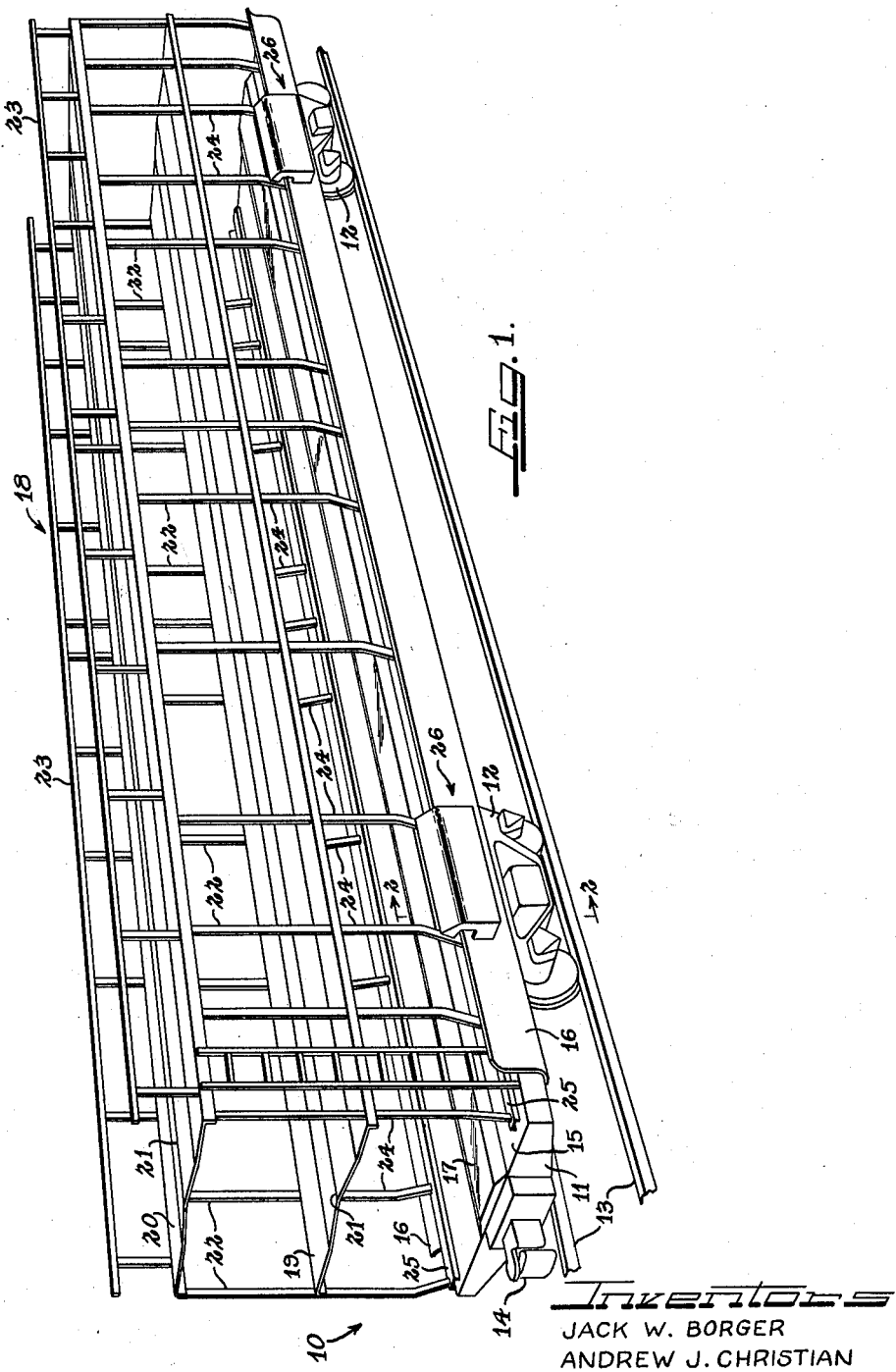
FIG. 1 is a perspective of the new and improved railway car of the present invention.

In FIG. 1 a car 10 which is improved in accordance with the teachings of the present invention includes a basic open deck body structure 11 supported by a pair of conventional wheel trucks 12 adjacent opposite ends thereof for operation along rails 13. Opposite ends of the car are provided with standard couplers 14 for use in the known manner. The car is formed with an open deck portion 15 which is defined along side margins thereof by upstanding side sills 16. The central longitudinal portion of the deck 15 may be formed with a raised guide track structure 17 to define along opposite sides thereof wheel track areas for the guiding of automobiles during the loading thereof along the car 10.

The car has mounted thereon a lading supporting rack structure 18 which is in the form of an automobile loader having vertically spaced tiers in the form of decks 19 and 20. Each deck 19 and 20 is provided with a longitudinally extending, raised central portion 21 which functions to define on opposite sides thereof wheel track areas for the guiding of automobiles during loading and unloading in the same manner as the raised central portion 17 of the car deck 15. The decks 19 and 20 are vertically spaced and supported by a plurality of frame members 22 suitably attached to side marginal portions thereof and the top deck 20 is formed with upstanding guard rails 23.

Figure 2:
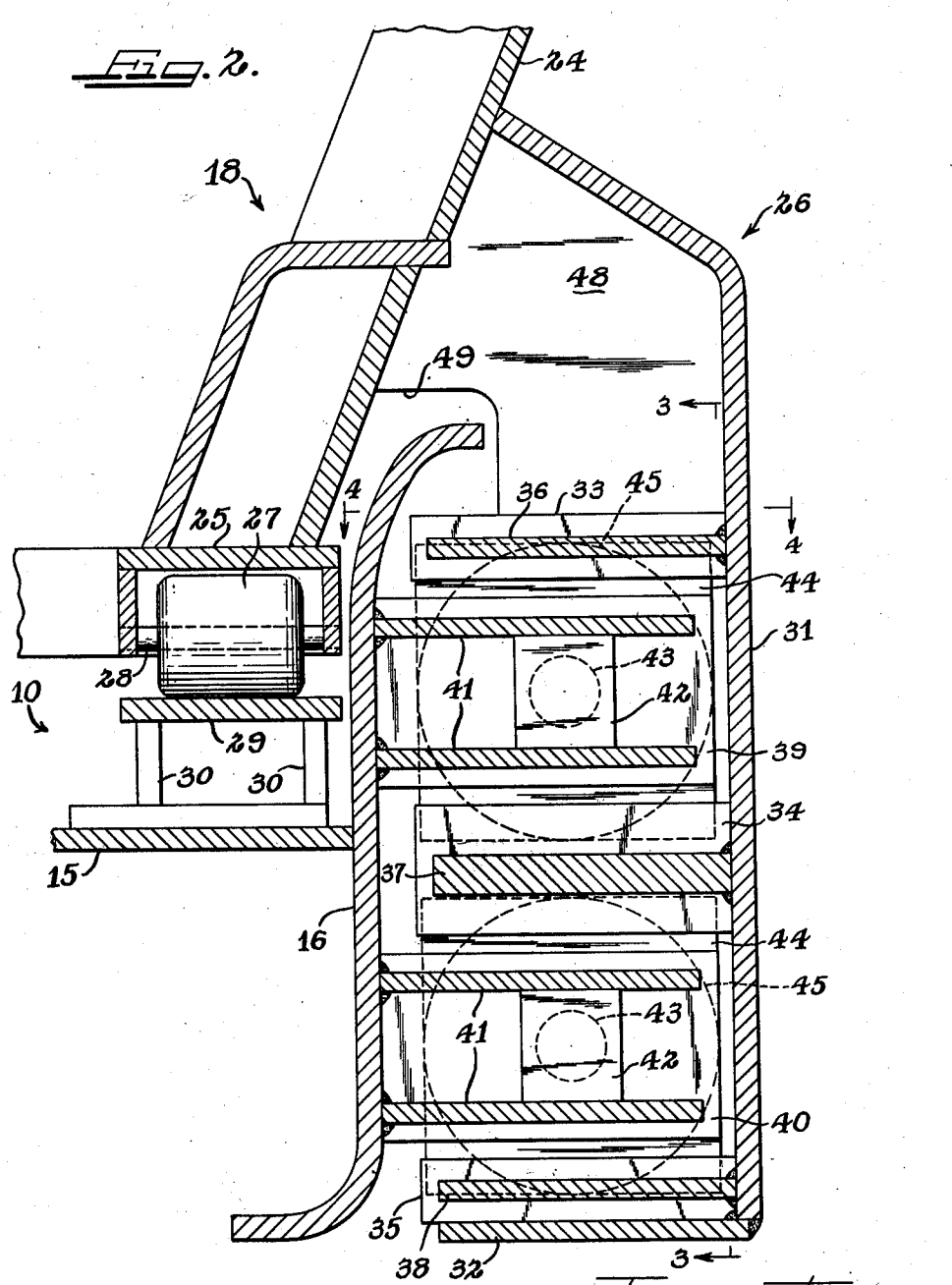
FIG. 2 is an enlarged fragmentary section of one of the cushioning rack attachment means of the railway car, this view being taken generally along line 2—2 of FIG. 1.

The decks 19 and 20 are preferably of sufficient width to generally correspond to the width of the car deck 15 including the side sills 16 thereof. The decks 19 and 20 are vertically supported on the car deck 15 by vertical frame members 24 which extend downwardly and are angled inwardly of the side sills 16. As best shown in FIG. 2, the vertical frame members 24 are connected to spaced longitudinally extending inverted channel members 25 which are located just inwardly of the side sills 16 in spaced relationship above the car deck portion 15. The rack member 18 is connected to the car 10 through cushion assemblies 26 which are located outboard of the side sill 16 above opposite ends of the wheel trucks 12.

FIG. 2 illustrates the vertical load support arrangement existing between the rack member 18 and the car 10. As previously described, the lower end of the vertical frame members 24 of the rack member 18 are inclined inwardly to be located within the side sills 16. Their lowermost ends are attached to an inverted channel member 25 which constitutes a roller housing in which any suitable number of rollers 27 may be mounted. As illustrated, each roller 27 is mounted on a transverse pin 28 which extends at opposite ends thereof into suitable journal openings in the side walls of the channel member 25. The rollers engage the top surface of a track plate 29 which is suitably mounted on the deck 15 of the car 10 by upstanding support members 30.

The track plate 29 need not extend continuously along the deck 15 of the car inwardly of each side sill 16. This track plate may be interrupted and provided in sections or segments corresponding to roller location along the channel member 25. With the arrangement described the rack member 18 is movable longitudinally of the car 10 relative thereto with the vertical load thereof including the lading supported thereon being transferred to the car 10 through the rollers 27, track plates 29 and related frame members. Thus the rack member 18 is arranged for travel relative to the car 10 and the length of each track plate 29 in association with a roller 27 will be sufficient to accommodate the total travel permitted by the cushion assemblies 26. Preferably the rollers 27 and track plates 29 will be located above cross bearers and bolsters (not shown) of the car 10 for efficient vertical load transmission to the strongest areas of the car structure. The rollers 27 need not be pin mounted but may be merely held captive in the housings 25 with the opposite ends of the housings being closed off to prevent displacement of the rollers therefrom. This particular arrangement would eliminate the possibility of pin shearing due to the substantial loads carried by the rack member 18.

Figure 3:
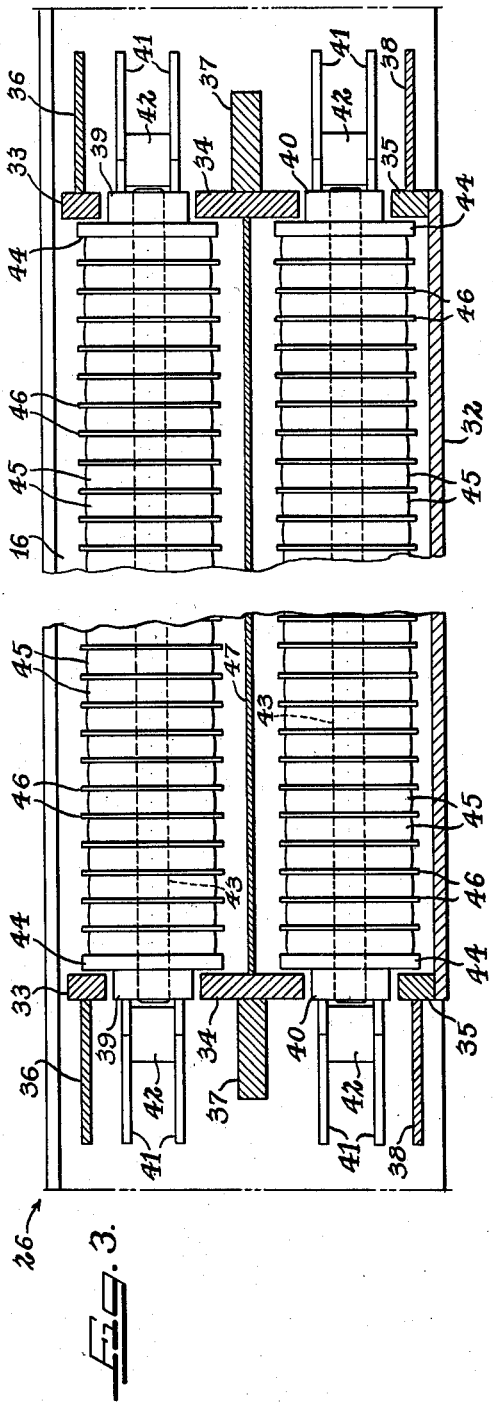
FIG. 3 is a fragmentary elevation of the cushioning rack attachment means of FIG. 2 as viewed generally along line 3—3 therein.
Figure 4:
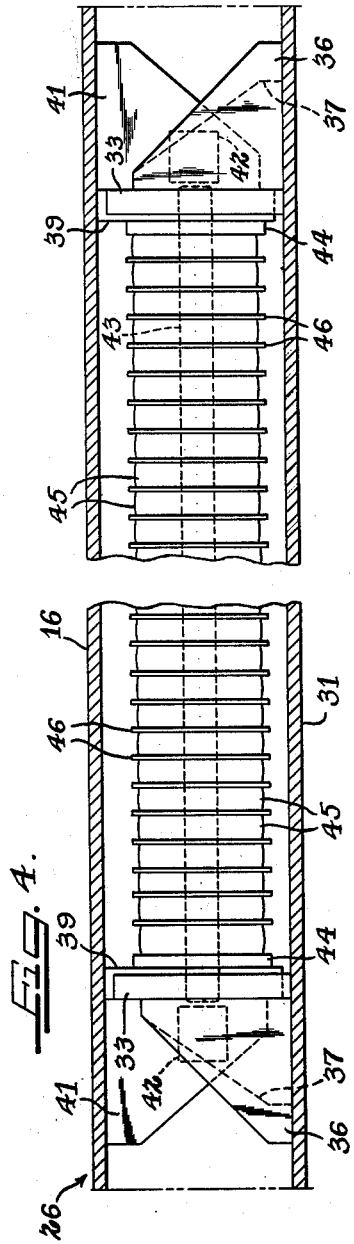
FIG. 4 is a fragmentary partly sectioned plan view of the cushioning rack attachment means as viewed generally along line 4—4 of FIG. 2.

FIGS. 2–4 illustrate the structural details of each cushion assembly 26. As best shown in FIG. 2, each assembly includes a rack member cushion plate 31 which extends outboard of the adjacent side sill 16 in overlying relation therewith. The top edge of the cushion plate 31 is suitably attached to adjacent vertical frame members 24 of the rack member 18 and the plate extends outwardly and downwardly into attachment with a bottom cover plate 32 which extends inwardly short of the side sill 16. The inner surface of the cushion plate 31 has attached thereto pairs of spaced and opposed stop plates 33, 34 and 35. These pairs of plates project radially inwardly from the cushion plate 31 and terminate short of the adjacent outer surface of the side sill 16. The plates 33, 34 and 35 are re-enforced by longitudinally directed back-up plates 36, 37 and 38, respectively. The re-enforcing plates are suitably attached to the cushion plate 31.

The outer surface of the side sill 16 has attached thereto pairs of spaced and opposed stop plates 39 and 40 which extend outwardly therefrom between the stop plates 33, 34 and 35. The plates 39 and 40 are backed up by pairs of re-enforcing plates 41 which mount therebetween cushion bar stop blocks 42. As best shown in FIGS. 3 and 4, the stop blocks 42 are spaced slightly rearwardly from their associated stop plates 39 and 40.

The stop plates 39 and 40 are formed with suitable apertures therein to receive opposite ends of a cushion assembly rod 43. Each rod has slidably received thereon a follower block 44 near opposite ends thereof and a plurality of rubber cushion pads 45 located between the follower blocks 44 and divided by separator plates 46. The basic cushion means formed from the plurality of pads 45 and separator plates 46 carried by a center rod 43 is of known design. The pads and separator plates are slidable on the rod 43 during compression of the pads and the rod 43 is slidable in the apertures in the stop plates 39 and 40. Each rod 43 is prevented from being displaced in the assembly by the stop blocks 42 which are mounted rearwardly of the stop plates 39 and 40. Each cushion assembly 26 is completed by a longitudinally extending re-enforcing plate 47 (see FIG. 3) which is suitably attached at opposite ends to the stop plates 34. End plates 48 (see FIG. 2) provide a side web or gusset at opposite ends of the assembly 26 and are suitably attached to the cushion plate 31. Each end plate 48 is formed with a cut-out portion 49 providing clearance for the top flange portion of a side sill 16. While a rubber pad-type cushion unit has been described, it will be understood that any equivalent structure such as a hydraulic cylinder may be used.

As best illustrated in FIG. 3, each cushion unit defined by the series of rubber pads 45, separator plates 46 and opposite end follower blocks 44 is confined between a pair of stop plates 39 or 40. The stop plates 39 and 40 as previously described are fixedly mounted on the side sill 16. The stop plates 33, 34 and 35 are positioned about the stop plates 39 and 40 and are located to engage the outer edge portions of the follower blocks 44 of the cushion units. The stop plates 33, 34 and 35 are fixedly mounted on the cushion plate 31 which as previously described is carried by the rack member 18 and travels therewith during movement of the rack member relative to the car 10 and side sills 16. Thus upon movement of the rack member 18 in either direction longitudinally of the car 10, the stop plates 33, 34 and 35 function to engage an associated follower block 44 of each cushion unit and move the block along the center rod 43 to compress the cushion pads 45. The opposite ends of the cushion units are anchored by the oppositely located stop plate 39 or 40 and the end of each cushion unit under compression is moved away from its associated stop plate 39 or 40. Compression of the cushion units will occur as a result of movement of the rack member 18 in response to operational shock, such as shock in buff or draft. Following adequate absorption of the shock forces by the cushion units, the inherent resiliency of the pads 45 thereof provide for a return of the various movable elements to their original relative positions of rest such as shown in FIG. 3. Thus the rack member 18 will be moved back to its original position on the car 10 and the operational shock is fully absorbed by the cushioning units with the lading carried by the rack member 18 being protected against such shock.

The cushion assemblies 26 are mounted outboard of the car 10 at opposite ends of the wheel trucks 12. This arrangement constitutes an important aspect of the invention in that the cushion assemblies 26 do not interfere with full utilization of the area of the car deck 15 in the mounting of lading relative thereto. The location of the cushion assemblies 26 adjacent the wheel trucks 12 is important with respect to the elimination of any problem of excessive overhang. Wheel truck locations on a railway car provide areas of maximum clearance during car operation. Thus the mounting of the outboard cushioning assemblies 26 in these areas eliminates any problem of operational clearance such as must be considered in connection with the center portion of the car during negotiation of a curve by the car.

Obviously certain modifications and variations of the invention as hereinbefore set forth may be made without departing from the spirit and scope thereof, and therefore only such limitations should be imposed as are indicated in the appended claims.

We claim:

1. In a railway car having a lading receiving deck portion on which a lading supporting rack member is longitudinally movably received, said car including a pair of spaced supporting wheel trucks adjacent opposite ends thereof, the side margins of said deck portion being defined by longitudinally continuous upstanding side sill structures constituting load bearing members of said car, the provision of car and rack member interconnecting means permitting longitudinal relative travel between said rack member and car, said interconnecting means including cushion means mounted outboard of said side sill structures solely along opposite sides of said car and over each of said wheel trucks and limited in longitudinal length to the areas of said wheel trucks, and cooperating cushion stop means, some of which stop means are carried on outer surface portions of the side sill structures and others of which stop means are carried on plate means forming a part of said rack member and overhanging said side sill structures outboard thereof in longitudinally clearing relation, said stop means and plate means being limited to the areas of said wheel trucks and said stop means receiving said cushion means therebetween and cooperatively functioning to compress said cushion means therebetween during longitudinal relative movement between said rack member and said car, whereby said deck portion and the operational clearance of said car are unimpeded by said interconnecting means and the load bearing continuity of said side sill structures is maintained.

2. In a railway car having a flat load supporting deck area on which a multiple vertically tiered lading supporting rack member is received and extends longitudinally of said deck area, said car including a pair of spaced supporting wheel trucks adjacent opposite ends thereof, the side margins of said deck area being defined by upstanding side sill structures laterally confining at least the bottom tier of said rack member therebetween, the provision of anti-friction rack member vertical load tranmitting support means between said rack member and car along said deck area, and car and rack member interconnecting means permitting controlled travel of said rack member on said support means relative to said car longitudinally thereof, said interconnecting means including longitudinally acting shock absorbing cushion means mounted outboard of said sill structures and at least substantially longitudinally confined to the areas of said wheel trucks for unimpeded use of said deck area in receiving said rack member and unimpeded car operational clearance, and cooperating cushion stop means, some of which stop means are carried on outer surface portions of the side sill structures in the areas of said wheel trucks and other of which stop means are carried on plate means in the areas of said wheel trucks and forming a part of said rack member and overhanging said side sill structures outboard thereof, said stop means receiving said cushion means therebetween and cooperatively functioning to compress said cushion means therebetween during longitudinal movement of said rack member relative to said car.

3. The railway car of claim 2 wherein said stop means on said side sill structures are fixed to said side sill structures and project outwardly therefrom, said plate means projecting downwardly outboard of said first named stop means with the stop means of said plate means projecting inwardly therefrom in freely horizontally movable relation with said first named stop means.

4. The railway car of claim 2 wherein each interconnecting means includes a plurality of vertically stacked cushion means, said stop means on said side sill structures being fixed to said side sill structure and projecting outwardly therefrom, said plate means projecting downwardly outboard of said first named stop means with the stop means of said plate means projecting inwardly therefrom in freely horizontally movable relation with said first named stop means.

References Cited by the Examiner
UNITED STATES PATENTS

| | | | |
|---|---|---|---|
| 1,693,193 | 11/28 | Duryea | 105—454 |
| 2,047,954 | 7/36 | Fitch | 105—366 |
| 2,072,988 | 3/37 | Kellett | 105—366 |
| 2,728,305 | 12/55 | Candlin | 105—454 |
| 2,906,405 | 9/59 | Erickson | 211—13 |
| 2,973,174 | 2/61 | Stanwick et al. | 105—368 |
| 2,984,084 | 5/61 | Talmey et al. | 105—366 |
| 2,985,117 | 5/61 | Norbom | 105—366 |
| 3,020,857 | 2/62 | Dean | 105—392.5 |

OTHER REFERENCES

Article entitled "What's New in Rolling Stock," page 23, Railway Age of February 15, 1960.

LEO QUACKENBUSH, *Primary Examiner.*

JAMES S. SHANK, *Examiner.*